United States Patent [19]
Wasserman

[11] Patent Number: 6,159,889
[45] Date of Patent: *Dec. 12, 2000

[54] UNBRIDGED MONOCYCLOPENTADIENYL METAL COMPLEX CATALYST AND A PROCESS FOR POLYOLEFIN PRODUCTION

[75] Inventor: Eric Paul Wasserman, Hopewell, N.J.

[73] Assignee: Union Carbide Chemicals & Plastics Technology Corporation, Danbury, Conn.

[*] Notice: This patent is subject to a terminal disclaimer.

[21] Appl. No.: 08/987,829

[22] Filed: Dec. 9, 1997

[51] Int. Cl.$^7$ ...................................................... C08F 4/642
[52] U.S. Cl. ........................... 502/125; 502/103; 526/160
[58] Field of Search ................................... 502/125, 103, 502/123; 526/160

[56] References Cited

U.S. PATENT DOCUMENTS

| | | | |
|---|---|---|---|
| 4,994,534 | 2/1991 | Rhee et al. | 526/88 |
| 5,276,117 | 1/1994 | Tomotsu et al. | 526/138 |
| 5,280,000 | 1/1994 | Kakugo et al. | 502/121 |
| 5,304,588 | 4/1994 | Boysen et al. | 523/204 |
| 5,625,016 | 4/1997 | Schiffino et al. | 526/160 |
| 5,703,181 | 12/1997 | Tashiro et al. | 526/140 |
| 5,817,590 | 10/1998 | Hasegawa et al. | 502/118 |
| 6,001,766 | 12/1999 | Kissin et al. | 502/115 |

FOREIGN PATENT DOCUMENTS

| | | |
|---|---|---|
| 0328248A2 | 8/1989 | European Pat. Off. . |
| 0328348 | 8/1989 | European Pat. Off. . |
| 0638595A2 | 2/1995 | European Pat. Off. . |
| 0 735 545 A2 | 10/1996 | European Pat. Off. . |
| 9707141 | 2/1997 | European Pat. Off. . |
| 0 781 783 A1 | 7/1997 | European Pat. Off. . |
| 0861853 | 9/1998 | European Pat. Off. . |
| 0861853A1 | 9/1998 | European Pat. Off. . |
| 19602543 | 7/1997 | Germany . |
| 97/07141 | 2/1997 | WIPO . |
| WO 97/23288 | 7/1997 | WIPO . |

OTHER PUBLICATIONS

Soga, Kazuo et al, (Polymerization of olefins with the catalyst system (RCp) TiCl$_3$ (R = H, CH$_3$)/SiO$_2$–common alkylaluminium activated with a suitable Lewis acid), Makromol. Chem. 193, 1687–1694 (1992) no month available.

Soga, Kazuo et al, (Structure of polypropene and poly(ethylene–co–propene) produced with an alumina–supported CpTiCl$_3$/common alkyaluminium catalyst system), Macromol. Chem. Phys. 195, 1503–1515 (1994) no month available.

Soga, Kazuo et al., (Copolymerization of ethylene and propylene with a CpTiCl$_3$/SiO$_2$–MAO catalyst system), Polymer Communications 1991, vol. 32, No. 10 no month available.

Uozumi, Toshiya et al, (Copolymerization of ethylene and 1–octene with Cp*TiCl$_3$ as catalyst supported on 3–aminopropyltrimethoxysilane treated SiO$_2$), Macromol. Rapid Commun. 18, 9–15 (1997) no month available.

Kim, Hyun Joon et al, (Copolymerization of ethylene and propylene using catalysts based on titanium compounds modified with trimethylsilanol), Polymer vol. 35, No. 6, 1994 no month available.

Conti, Giuseppe et al, (Influence of ligands and cocatalyst on the activity in ethylene polymerization of soluble titanium complexes), Journal of Molecular Catalysis 89 (1994) 41–50 no month available.

Idemitsu Kosan Co Ltd, Japanese Abstract, JP 09071615–A, Mar. 1997.

Idemitsu Kosan Co Ltd, Japanese Abstract, JP 09012634–A, Jan. 1997.

Idemitsu Kosan Co Ltd, Japanese Abstract, JP 08319313–A, Dec. 1996.

Sumitomo Chem Co Ltd, Japanese Abstract, JP 08208732–A, Aug. 1996.

Asahi Kasei Kogyo KK, Japanese Abstract, WO 9618658–A1, Jun. 1996.

Idemitsu Kosan Co Ltd, Japanese Abstract, WO 9518158–A1, Jul. 1995.

Idemitsu Kosan Co Ltd, Japanese Abstract, JP 08231622–A, Sep. 1996.

English translation of Japanese Application # H7–160441, Sep. 1996, Japanese patent 8–231622.

*Primary Examiner*—Christine Skane
*Attorney, Agent, or Firm*—B. Deppenbrock; R. C. Brown

[57] ABSTRACT

There is provided a catalyst comprising: (A) a titanium metal compound represented by the formula: $(C_5R^1{}_5)TiX_2Y$; (B) a compound having the formula: $R^2H$, wherein $R^2$ is an alkoxy, thiolato, carboxyl, or amino group; (C) an aluminoxane, and optionally a support or spray drying material (D). There is also provided a polymerization process employing the catalyst, a polymer produced using the catalyst, and a cable produced therefrom.

6 Claims, No Drawings

UNBRIDGED MONOCYCLOPENTADIENYL METAL COMPLEX CATALYST AND A PROCESS FOR POLYOLEFIN PRODUCTION

FIELD OF THE INVENTION

The invention relates to a catalyst composition for olefin polymerization and a process for polymerizing polyolefins, especially copolymers of ethylene-alpha olefins, ethylene-alpha olefin-dienes, and polypropylene (homopolymer and copolymer) using a metallocene catalyst. More particularly, the invention concerns the polymerization of polyolefins having less than 50% crystallinity using a metallocene catalyst containing a transition metal (e.g., titanium) and an aluminoxane.

BACKGROUND OF THE INVENTION

There has been a growing interest in the use of metallocenes for polyolefin production. Many metallocenes for polyolefin production are difficult and time-consuming to prepare, require large amounts of aluminoxane, and exhibit poor reactivity toward higher olefins, especially for making ethylene-alpha olefin copolymers and ethylene-alpha olefin-diene terpolymers. Moreover, the ethylene-alpha olefin copolymers and ethylene-alpha olefin-diene terpolymers prepared using these metallocenes often have undesirably low molecular weights (i.e., Mw less that 50,000).

The so-called "constrained geometry" catalysts such as those disclosed in EP 0 420 436 and EP 0 416 815 can provide a high comonomer response and a high molecular weight copolymer, but are difficult to prepare and purify, and, therefore, are expensive. Another drawback of the bridged amido-cyclopentadienyl titanium catalyst system is that in order to form an active oxide-supported catalyst, it is necessary to use fairly high levels of alumoxane (see, e.g., WO096/16092) or to employ mixtures of aluminum alkyl and an activator based on derivatives of tris(pentafluorophenyl)borane (see, e.g., WO095/07942), itself an expensive reagent, thus raising the cost of running the catalyst. In the constrained geometry catalyst art, such as in EP 0 416 815 A2 (page 2, lines 5–9 and 43–51), it is pointed out that the angle formed by the cyclopentadienyl centroid, transition metal, and amide nitrogen is critical to catalyst performance. Indeed, comparison of the published result using a bridged amido-cyclopentadienyl titanium systems with similar unbridged systems has generally shown the unbridged analogs to be relatively inactive. One such system, described in U.S. Pat. No. 5,625,016 shows very low activity, while having some of the desirable copolymerization behavior.

In contrast to the constrained geometry catalysts, the catalyst of the invention is unconstrained or unbridged and relatively easily and inexpensively prepared using commercially available starting materials. Further, the level of aluminoxane utilized can be lowered. That is, in the present invention, the precursor can be dried onto a support or dried with a spray drying material with Al:Ti ratios below 100:1 to form highly active catalysts with similar polymerization behavior to their unsupported analogs of the invention and polymerization behavior similar to constrained catalysts.

In Idemitsu Kosan JPO 8/231622, it is reported that the active catalyst requires a phenol, may be formed starting from $(C_5Me_5)Ti(OMe)3$, and that the polymer formed has a relatively wide or broad compositional distribution. The present invention does not utilize this precursor or a phenol.

Typically, polyolefins such as EPRs and EPDMs are produced commercially using vanadium catalysts. In contrast to polyolefins produced using vanadium catalysts, those produced by the catalysts of the present invention have high molecular weight and narrower composition distribution (i.e., lower crystallinity at an equivalent alpha olefin content.

There is an on-going need to provide a catalyst employing a metallocene which is easy to prepare, does not require large amounts of aluminoxane and which readily copolymerizes to produce ethylene-alpha olefin copolymers, ethylene-alpha olefin-diene terpolymers, and polypropylene, as well as producing polyethylene.

SUMMARY OF THE INVENTION

Accordingly, the present invention provides a catalyst comprising:

(A) a titanium metal compound represented by the formula: $(C_5R^1{}_5)TiX_2Y$, wherein each $R^1$ is independently selected from the group consisting of hydrogen, a $C_1$–$C_8$ alkyl, an aryl, and a heteroatom-substituted aryl or alkyl; each X is a halide atom (F, Br, Cl, or I); and Y is a monoanionic ligand selected from the group consisting of a halide, a $C_1$–$C_{18}$ alkyl, an aryl, a $C_1$–$C_{18}$ alkoxide, aryloxide, amide, thiolate, carboxylate, carbamate and mixture thereof, with the proviso that there is no linkage between Y and any $R^1$ group which forms a ring;

(B) a compound having the formula: $R^2H$, wherein $R^2$ is selected from the group consisting of $R^3O$—, $R^3S$—, $R^3{}_2N$—, and $R^4CO_2$—, in which each $R^3$ is the same or different and is a linear or branched $C_1$–$C_3$ alkyl or hydrogen; and wherein $R^4$ is a linear or branched $C_1$–$C_6$ alkyl or aryl group; and (C) an aluminoxane.

There is also provided a polymerization process employing the catalyst composition and a polymer produced using the above-described catalyst. A cable composition is also provided.

DETAILED DESCRIPTION OF THE INVENTION

The catalyst contains a transition metal precursor (Component A), a compound containing an active proton (Component B), and an aluminoxane (Component C). The catalyst of the invention can be unsupported (that is, in liquid form), supported, spray dried, or used as a prepolymer. Support and/or spray dried material is described as optional Component D.

Component A. The catalyst composition comprises a transition metal precursor which is a titanium metal compound represented by the formula: $(C_5R^1{}_5)TiX_2Y$, wherein each $R^1$ is independently selected from the group consisting of hydrogen, a $C_1$–$C_8$ alkyl, an aryl, a heteroatom-substituted aryl or alkyl; each X is a halide atom (F, Br, Cl, or I); and Y is monoanionic ligand selected from the group consisting of a halide, a $C_1$–$C_{18}$ alkyl, an aryl, a $C_1$–$C_{18}$ alkoxide, aryloxide, amide, thiolate, carboxylate, carbamate and mixture thereof, with the proviso that there is no linkage between a Y group and any $R^1$ group which forms a ring (i.e., unconstrained). Illustrative titanium compounds can include: cyclopentadienyltitanium trichloride; pentamethylcyclopentadienyltitanium trichloride; pentamethylcyclopentadienyltitanium tribromide; pentamethylcyclopentadienyltitanium triiodide; pentamethylcyclopentadienyltitanium dichloride mono-t-butoxide; pentamethylcyclopentadienyltitanium dichloride mono(tri-t-butylsiloxide); pentamethylcyclopentadienyltitanium dichloride mono(trimethlysiloxide); 1,3-bis (trimethylsilyl)cyclopentadienyltitanium trichloride; tetramethylcyclopentadienyltitanium trichloride; indenyltitanium trichloride; indenyltitanium dichloride mono-t-butoxide; indenyltitanium dichloride mono(trimethylsiloxide); fluorenyltitanium trichloride; fluorenyltitanium dichloride mono-t-butoxide; fluorenyltitanium dichloride mono (trimethylsiloxide); 4,5,6,7-tetrahydroindenyltitanium trichloride; 1,2,3,4,5,6,7,8-octahydrofluorenyltitanium trichloride; 1,2,3,4-tetrahydrofluorenyl-titanium trichloride; 1,2,3-trimethylcyclopentadienyltitanium trichloride; 1,2,4-trimethylcyclopentadienyltitanium trichloride; 1-n-butyl-3-methylcyclopentadienyltitanium trichloride; methylindenyltitanium trichloride; 2-methylindenyltitanium trichloride; and 4,5,6,7-tetrahydro-2-methylindenyltitanium trichloride.

Component B. The catalyst composition contains a compound having an active proton. Component B has the formula: $R^2H$, wherein $R^2$ is selected from the group consisting of alkoxy ($R^3O$—), thiolato ($R^3S$—), amino ($R^3_2N$—), and carboxyl ($R^4CO_2$—), in which each $R^3$ is the same or different and is a linear or branched $C_1$–$C_3$ alkyl or hydrogen; and wherein $R^4$ is a linear or branched $C_1$–$C_6$ alkyl or aryl group. Illustrative of these Component B compounds can include, for example, water, methanol, ethanol, 2-propanol, ethanethiol, diethylamine, t-butylamine, benzoic acid, acetic acid, and pivalic acid. Preferred among these are those having a $C_1$–$C_{12}$ alkoxy group. Most preferred are methanol and ethanol. While not wishing to be bound by any particular theory, it is believed that the combination of Component A and Component B functions so as to slow, prevent, or reverse the reduction of higher valence state Ti to lower valence state Ti (e.g., Ti(IV) to Ti (III)) such as by aluminoxane (MAO). Preferably, Compound B has a $pK_a$ ranging from about 0 to 20.

Component C. A cocatalyst capable of activating the catalyst precursor is employed as Compound C. Preferably, the activating cocatalyst is a linear or cyclic oligomeric poly(hydrocarbylaluminum oxide) which contain repeating units of the general formula —(Al(R*)O)—, where R* is hydrogen, an alkyl radical containing from 1 to about 12 carbon atoms, or an aryl radical such as a substituted or unsubstituted phenyl or naphthyl group. More preferably, the activating cocatalyst is an aluminoxane such as methylaluminoxane (MAO) or modified methylaluminoxane (MMAO).

Aluminoxanes are well known in the art and comprise oligomeric linear alkyl aluminoxanes represented by the formula:

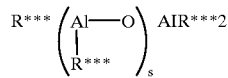

and oligomeric cyclic alkyl aluminoxanes of the formula:

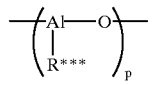

wherein s is 1–40, preferably 10–20; p is 3–40, preferably 3–20; and R*** is an alkyl group containing 1 to 12 carbon atoms, preferably methyl.

Aluminoxanes may be prepared in a variety of ways. Generally, a mixture of linear and cyclic aluminoxanes is obtained in the preparation of aluminoxanes from, for example, trimethylaluminum and water. For example, an aluminum alkyl may be treated with water in the form of a moist solvent. Alternatively, an aluminum alkyl, such as trimethylaluminum, may be contacted with a hydrated salt, such as hydrated ferrous sulfate. The latter method comprises treating a dilute solution of trimethylaluminum in, for example, toluene with a suspension of ferrous sulfate heptahydrate. It is also possible to form methylaluminoxanes by the reaction of a tetraalkyl-dialuminoxane containing $C_2$ or higher alkyl groups with an amount of trimethylaluminum that is less than a stoichiometric excess. The synthesis of methylaluminoxanes may also be achieved by the reaction of a trialkyl aluminum compound or a tetraalkyldialuminoxane containing $C_2$ or higher alkyl groups with water to form a polyalkyl aluminoxane, which is then reacted with trimethylaluminum. Further, modified methylaluminoxanes, which contain both methyl groups and higher alkyl groups, i.e., isobutyl groups, may be synthesized by the reaction of a polyalkyl aluminoxane containing $C_2$ or higher alkyl groups with trimethylaluminum and then with water as disclosed in, for example, U.S. Pat. No. 5,041,584.

The mole ratio of aluminum atoms contained in the poly(hydrocarbylaluminum oxide) to total metal atoms contained in the catalyst precursor is generally in the range of from about 2:1 to about 100,000:1, preferably in the range of from about 10:1 to about 10,000:1, and most preferably in the range of from about 50:1 to about 2,000:1.

Preferably, Component C is an alumoxane of the formula $(AlR^5O)_m(AlR^6O)_n$ in which $R^5$ is a methyl group, $R^6$ is a $C_1$–$C_8$ alkyl, m ranges from 3 to 50; and n ranges from 1 to 20. Most preferably, $R^6$ is a methyl group.

Component D. Optionally, one or more of the above-described catalyst components may be impregnated in or deposited on a support, or alternatively, spray dried with a support material. These support or spray drying materials are typically solid materials which are inert with respect to the other catalyst components and/or reactants employed in the polymerization process. Suitable support materials can include silica, carbon black, polyethylene, polycarbonate, porous crosslinked polystyrene, porous crosslinked polypropylene, alumina, thoria, titania, zirconia, magnesium halide (e.g., magnesium dichloride), and mixtures thereof. These are composed of porous particulate supports that usually have been calcined at a temperature sufficient to remove substantially all physically bound water.

The molar ratio of Component B to Component A ranges from about 2:1 to 200:1; preferably about 2:1 to 50:1; and, most preferably, is about 2:1 to 20:1. The molar ratio of Component C to Component A ranges from about 10:1 to 10,000:1; preferably about 30:1 to 2,000:1; and, most preferably, is about 50:1 to 1000:1, with the proviso that the ratio of Component B to Component C does not exceed 0.7:1, and is preferably between 0.001:1 to 0.050:1. When Component D is employed as a support or spray drying material, it is present in an amount ranging from about 7 to 200, preferably 12 to 100, and most preferably 20 to 70 g/mmol (grams of Component D per mmol Component A).

Process for Making the Catalyst. The individual catalyst components (Components A, B, C, and D (optional)) can be combined in any order prior to polymerization. Alternatively, the individual catalyst components can be fed to the polymerization reactor such that the catalyst is formed in-situ.

In a preferred preparation for producing the active catalyst, Components A, B, and C are mixed in an inert hydrocarbon solvent suitable for dissolving Components A through C under an inert atmosphere for at least 15 minutes or longer (e.g., up to 3 days). The components are combined such that Component A is first mixed with at least two molar equivalents of Component B. Typical inert solvents can include, for example, toluene, xylene, chlorobenzene, etc. Preferred among these solvents is toluene. Alternatively, all of Component A is mixed with at least 1 equivalent of Component B for at least 15 minutes; the remaining portion of Component B is combined with all of Component C; and the two mixtures are then combined. The combined mixture regardless of preparation can then be directly injected into the polymerization reactor using techniques known to those skilled in the art.

When Component D is employed, it can be added to any of the above-described solutions and/or mixtures. Preferably, Component D, when employed is combined with a solution of Component C by mixing for at least 20 to 30 minutes. The solution of Components C and D is then combined with a solution of Components A and B and agitated (e.g., by stirring) for 15 minutes or longer (e.g., up to 3 days). This solution is then fed to the reactor or may be recovered as a free-flowing powder by decantation, filtration, and/or vacuum drying. The solid catalyst thus prepared may be introduced into the reactor by a variety of methods known to those skilled in the art.

Polymerization Process and Conditions.

The above-described catalyst composition can be used for the polymerization of monomers (e.g., olefins and/or diolefins and vinyl aromatic compounds) in a suspension, solution, slurry, or gas phase process using known equipment and reaction conditions, and it is not limited to any specific type of reaction. However, the preferred polymerization process is a gas phase process employing a fluidized bed. Gas phase processes employable in the present invention can include so-called "conventional" gas phase processes, "condensed-mode," and, most recent, "liquid-mode" processes.

In many processes, it is desirable to include a scavenger in the reactor to remove adventitious poisons such as water or oxygen before they can lower catalyst activity. In such cases, it is recommended that trialkylaluminum species not be used, but rather that methylalumoxane be employed for such purposes.

Conventional fluidized processes are disclosed, for example, in U.S. Pat. Nos. 3,922,322; 4,035,560; 4,994,534; and 5,317,036.

Condensed mode polymerizations, including induced condensed mode, are taught, for example, in U.S. Pat. Nos. 4,543,399; 4,588,790; 4,994,534; 5,317,036; 5,352,749; and 5,462,999. For polymerizations producing alpha olefin homopolymers and copolymers condensing mode operation is preferred.

Liquid mode or liquid monomer polymerization mode is described in U.S. Pat. No. 4,453,471; U.S. Ser. No. 510,375; and WO 96/04322 (PCT/US95/09826) and WO 96/04323 (PCT/US95/09827). For polymerizations such as ethylene-propylene copolymer (e.g., EPMs), ethylene-propylene-diene terpolymer (e.g., EPDMs), and diolefin polymerizations, it is preferable to use liquid mode and employing an inert particulate material, a so-called fluidization aid. Inert particulate materials are described, for example, in U.S. Pat. No. 4,994,534 and include carbon black, silica, clay, talc, and mixtures thereof. Of these, carbon black, silica, and mixtures of them are preferred.

The polymerizations can be carried out in a single reactor or multiple reactors, typically two or more in series, can also be employed. The essential parts of the reactor are the vessel, the bed, the gas distribution plate, inlet and outlet piping, at least one compressor, at least one cycle gas cooler, and a product discharge system. In the vessel, above the bed, there is a velocity reduction zone, and in the bed a reaction zone.

Generally, all of the above modes of polymerizing are carried out in a gas phase fluidized bed containing a "seed bed" of polymer which is the same or different from the polymer being produced. Preferably, the bed is made up of the same granular resin that is to be produced in the reactor.

The bed is fluidized using a fluidizing gas comprising the monomer or monomers being polymerized, initial feed, make-up feed, cycle (recycle) gas, inert carrier gas (e.g., nitrogen, argon, or inert hydrocarbon such as ethane, propane, isopentane) and, if desired, modifiers (e.g., hydrogen). Thus, during the course of a polymerization, the bed comprises formed polymer particles, growing polymer particles, catalyst particles, and optional flow aids fluidized by polymerizing and modifying gaseous components introduced at a flow rate or velocity sufficient to cause the particles to separate and act as a fluid.

In general, the polymerization conditions in the gas phase reactor are such that the temperature can range from sub-atmospheric to super-atmospheric, but is typically from about 0 to 120° C., preferably about 40 to 100° C., and most preferably about 40 to 80° C. Partial pressure will vary depending upon the particular monomer or monomers employed and the temperature of the polymerization, and it can range from about 1 to 300 (6.89 to 2,067 kiloPascals), preferably 1 to 100 psi (6.89 to 689 kiloPascals). Condensation temperatures of the monomers are well known. In general, it is preferred to operate at a partial pressure slightly above to slightly below (that is, for example, ±10° C. for low boiling monomers) the dew point of the monomer.

Polymers Produced. Olefin polymers that may be produced according to the invention include, but are not limited to, ethylene homopolymers and copolymers, homopolymers of linear or branched higher alpha-olefins containing 3 to about 20 carbon atoms, and interpolymers of ethylene and such higher alpha-olefins, with densities ranging from about 0.84 to about 0.96. Suitable higher alpha-olefin monomers for producing them include, for example, propylene, 1-butene, 1-pentene, 1-hexene, 4-methyl-1-pentene, 1-octene, and 3,5,5-trimethyl-1-hexene. Preferably, the olefin polymers according to the invention are also be based on or contain conjugated or non-conjugated dienes, such as linear, branched, or cyclic hydrocarbon dienes having from about 4 to about 20, preferably 4 to 12, carbon atoms. Preferred dienes include 2-methyl-pentadiene, 1,5-hexadiene, 5-vinyl-2-norbornene, 1,7-octadiene, 7-methyl-1,6-octadiene, vinyl cyclohexene, dicyclopentadiene, butadiene, isobutylene, isoprene, ethylidene norbornene and the like. Aromatic compounds having vinyl unsaturation such as styrene and substituted styrenes, and polar vinyl monomers such as acrylonitrile, maleic acid esters, vinyl acetate, acrylate esters, methacrylate esters, vinyl trialkyl silanes and the like may be polymerized according to the invention as well. Specific olefin polymers that may be made according to the invention include, for example, polyethylene, polypropylene, ethylene/propylene rubbers (EPR's), ethylene/propylene/diene terpolymers (EPDM's), polybutadiene, polyisoprene and the like.

The present invention provides a cost-effective catalyst and method for making compositionally homogeneous, high-molecular weight ethylene-alpha olefin copolymers with very high levels of alpha olefin. One advantage is that the catalyst has a very high comonomer response, so the ratio of alpha olefin to ethylene present in the reaction medium can be very low, which increases the partial pressure of ethylene possible in the reactor. This improves catalyst activity. It also lessens the level of residual comonomer which must be purged or otherwise recovered from the polymer after it exits the reactor. The catalyst is also suitable for incorporation of non-conjugated dienes to form completely amorphous rubbery or elastomeric compositions. The catalyst's very high comonomer response also makes it a good candidate for the incorporation of long-chain branching into the polymer architecture through the insertion of vinyl-ended polymer chains formed via β-hydride elimination. The ethylene copolymers produced by the present invention have polydespersity values (PDI) ranging from 2 to 4.6, preferably 2.6 to 4.2.

Polymers produced using the catalyst and/or process of the invention have utility in wire and cable applications, as well as in other articles such as molded and extruded articles such as hose, belting, roofing materials, tire components (tread, sidewall innerliner, carcass, belt). Polyolefins produced using the catalyst and/or process of the invention can be cross-linked, vulcanized or cured using techniques known to those skilled in the art.

In particular, there is provided by the invention a cable comprising one or more electrical conductors, each, or a core of electrical conductors, surrounded by an insulating composition comprising a polymer produced in a gas phase polymerization process using the catalyst of the invention. Preferably, the polymer is polyethylene; a copolymer of ethylene, one or more alpha-olfins having 3 to 12 carbon atoms, and, optionally, a diene(s).

Conventional additives, which can be introduced into the cable and/or polymer formulation, are exemplified by antioxidants, coupling agents, ultraviolet absorbers or stabilizers, antistatic agents, pigments, dyes, nucleating agents, reinforcing fillers or polymer additives, slip agents, plasticizers, processing aids, lubricants, viscosity control agents, tackifiers, anti-blocking agents, surfactants, extenders oils, metal deactivators, voltage stabilizers, flame retardant fillers and additives, crosslinking agents, boosters, and catalysts, and smoke suppressants. Fillers and additives can be added in amounts ranging from less than about 0.1 to more than about 200 parts by weight for each 100 parts by weight of the base resin, for example, polyethylene.

Examples of antioxidants are: hindered phenols such as tetrakis[methylene(3,5-di-tert-butyl-4-hydroxyhydrocinnamate)]-methane, bis [(beta-(3,5 di-tert-butyl-4-hydroxybenzyl)-methylcarboxyethyl)]sulphide, 4,4'-thiobis(2-methyl-6-tert-butylphenol), 4,4'-thiobis(2-tert-butyl-5-methylphenol), 2,2'-thiobis(4-methyl-6-tert-butylphenol), and thiodiethylene bis(3,5 ditert-butyl-4-hydroxy)hydrocinnamate; phosphites and phosphonites such as tris(2,4-di-tert-butylphenyl) phosphite and di-tert-butylphenyl-phosphonite; thio compounds such as dilaurylthiodipropionate, dimyristylthiodipropionate, and distearylthiodipropionate; various siloxanes; and various amines such as polymerized 2,2,4-trimethyl-1,2-dihyroquinoline. Antioxidants can be used in amounts of about 0.1 to about 5 parts by weight per 100 parts by weight of polyethylene.

The resin can be crosslinked by adding a crosslinking agent to the composition or by making the resin hydrolyzable, which is accomplished by adding hydrolyzable groups such as —Si(OR)$_3$ wherein R is a hydrocarbyl radical to the resin structure through copolymerization or grafting.

Suitable crosslinking agents are organic peroxides such as dicumyl peroxide; 2,5-dimethyl-2,5-di(t-butylperoxy) hexane; t-butyl cumyl peroxide; and 2,5-dimethyl-2,5-di(t-butylperoxy)hexane-3. Dicumyl peroxide is preferred.

Hydrolyzable groups can be added, for example, by copolymerizing ethylene with an ethylenically unsaturated compound having one or more —Si(OR)$_3$ groups such as vinyltrimethoxy-silane, vinyltriethoxysilane, and gamma-methacryloxypropyltrimethoxysilane or grafting these silane compounds to the resin in the presence of the aforementioned organic peroxides. The hydrolyzable resins are then crosslinked by moisture in the presence of a silanol condensation catalyst such as dibutyltin dilaurate, dioctyltin maleate, dibutyltin diacetate, stannous acetate, lead naphthenate, and zinc caprylate. Dibutyltin dilaurate is preferred.

Examples of hydrolyzable copolymers and hydrolyzable grafted copolymers are ethylene/vinyltrimethoxy silane copolymer, ethylene/gamma-methacryloxypropyltrimethoxy silane copolymer, vinyltrimethoxy silane grafted ethylene/ethyl acrylate copolymer, vinyltrimethoxy silane grafted linear low density ethylene/1-butene copolymer, and vinyltrimethoxy silane grafted low density polyethylene.

The cable and/or polymer formulation can contain a polyethylene glycol (PEG) as taught in EP 0 735 545.

The cable of the invention can be prepared in various types of extruders, e.g., single or twin screw types. Compounding can be effected in the extruder or prior to extrusion in a conventional mixer such as Brabender™ mixer or Banbury™ mixer. A description of a conventional extruder can be found in U.S. Pat. No. 4,857,600. A typical extruder has a hopper at its upstream end and a die at its downstream end. The hopper feeds into a barrel, which contains a screw. At the downstream end, between the end of the screw and the die, is a screen pack and a breaker plate. The screw portion of the extruder is considered to be divided up into three sections, the feed section, the compression section, and the metering section, and two zones, the back heat zone and the front heat zone, the sections and zones running from upstream to downstream. In the alternative, there can be multiple heating zones (more than two) along the axis running from upstream to downstream. If it has more than one barrel, the barrels are connected in series. The length to diameter ratio of each barrel is in the range of about 15:1 to about 30:1. In wire coating, where the material is crosslinked after extrusion, the die of the crosshead feeds directly into a heating zone, and this zone can be maintained at a temperature in the range of about 130° C. to about 260° C., and preferably in the range of about 170° C. to about 220° C.

All references cited herein are incorporated by reference.

Whereas the scope of the invention is set forth in the appended claims, the following specific examples illustrate certain aspects of the present invention. The examples are set forth for illustration only and are not to be construed as limitations on the invention, except as set forth in the claims. All parts and percentages are by weight unless otherwise specified.

EXAMPLES

Glossary and Abbreviations $C_3=:C_2=$, fill: ratio of propylene to ethylene in the pressurization stage of the polymerization $C_3=:C_2=$, feed: ratio of propylene to ethylene in the period between pressurization and termination DSC: differential scanning calorimetry FI: flow index, ASTM standard $I_{21}$, in dg/min MAO: methylalumoxane PDI: polydispersity index, or $M_w/M_n$ PRT: peak recrystallization temperature, or the exothermic peak of the cooling trace in a DSC experiment SEC: size-exclusion chromatography method for molecular weight estimation Materials Cyclopentadienyltitanium trichloride was obtained from Aldrich Chemical Co. and was used without further purification. Pentamethylcyclopentadienyltitanium trichloride and pentamethylcyclopentadienyltitanium trimethoxide were obtained from Strem Chemicals Inc., and also used without further purification. Methylalumoxane was purchased from the Ethyl Corporation and/or the Albemarle Co. and had a nominal concentration of 1.8 mol(Al)/L in toluene.

Procedure for Estimation of Propylene Content by Infrared Spectroscopy:

Thin polymer samples for spectroscopy were prepared either by casting a hexane solution of the polymer onto a disk of potassium bromide and then allowing the sample to dry or by placing a small amount of polymer between two sheets of poly(ethylene terephthalate) film and subjecting the polymer to pressure and melting temperatures. A Nicolet® Model 510 IR spectrometer was then used to acquire the IR spectrum, with 32 scans for each sample and background spectrum and 4 cm$^{-1}$ resolution. Peak heights, suitably corrected for baseline absorbance, were measured at the following frequencies: 722, 1155, and 1380 cm$^{-1}$. If the absorbance at 1380 cm$^{-1}$ was less than 2.5, then the propylene content was calculated as follows:

$$\text{wt \% } C_3^= = 21.8 - \left(15.4 \cdot \ln\left(\frac{A_{722}}{A_{1380}}\right)\right);$$

Otherwise, the propylene content was estimated by the following relationship:

$$\text{wt \% } C_3^= = 70.9 - \left(18.7 \cdot \ln\left(\frac{A_{722}}{A_{1155}}\right)\right).$$

Example 1

A small glass vial was charged with magnetic stirbar and a toluene (HPLC grade, previously held over dried molecular sieves and sparged with nitrogen) solution of $(C_5Me_5)TiCl_3$ (0.0031 mmol/L) and methanol (0.0125 mmol/L). A glass bottle equipped with stirbar was charged with 50 mL hexanes (previously dried by 13X molecular sieves and sparged with nitrogen) under nitrogen, followed by 1 mmol of MAO as toluene solution and 0.32 mL of the $(C_5Me_5)TiCl_3$/methanol solution (0.001 mmol Ti). The mixture was transferred by nitrogen overpressure into a 1.3 L stainless-steel reactor (Fluitron®) which had been dried by flowing nitrogen through it while it was held at 100° C. for at least 1 hour (h). The reactor had a removable two-baffle insert and a variable speed propeller-shaped impeller, which was run at 800 rpm. Following the introduction of the hexane solution of the catalyst mixture, an additional 600 mL hexanes were transferred into the reactor. The reactor was sealed and heated to 60° C., where it was held throughout the remainder of the run by a combination of cold water and steam flowed through the reactor jacket. When the reactor had reached approximately 40° C. the reactor was vented of most of the nitrogen, resealed, and pressurized with 107 psig (0.74 MPa) of a mixture of propylene and ethylene, with the ethylene flow made to equal that of propylene, both measured in L/minute (min.). When the reactor had reached within ca. 0.03 MPa of the final pressure, the ratio of propylene to ethylene flows was adjusted to 1:3. Polymerization continued until 30 minutes after the introduction of monomer gases, at which point the reactor was vented and the temperature rapidly cooled to room temperature. Polymer was recovered by transfer of the polymer solution to a large glass beaker, to which were then added ca. 500 mL of a 1:1 mixture by volume of methanol and 2-propanol. The polymer precipitated and was filtered and dried in a vacuum oven at 40° C. for at least 16 h. The recovered polymer weighed 8.9 g, for a catalyst activity of 17.8 kg(EPR)/(mmol(Ti)·h). The polymer contained 38 weight % propylene by IR spectroscopy, FI=0.53, $M_W$=3.79×10$^5$ and PDI=2.77.

Examples 2–5

Polymerizations were conducted at 60° C. in 650 mL hexanes, with preparation of catalysts similar to that of Example 1 with minor differences in catalyst solution concentration. Other conditions and results, are set forth in Table I.

Comparative Example C1

The polymerization described in Example 1 was repeated (with the following minor differences: total reactor pressure=99 psig (0.68 MPa); concentration of the toluene solution of $(C_5Me_5)TiCl_3$=2.8 mmol/L; $(C_5Me_5)TiCl_3$ solution used=0.36 mL), except that no methanol was injected into the $(C_5Me_5)TiCl_3$ solution. The polymer was recovered by allowing the polymer solution to dry in air overnight, and weighed 3.2 g, for a catalyst activity of 6.5 kg(EPR)/(mmol (Ti)·h). The polymer contained 39 weight % propylene by IR spectroscopy.

Comparative Examples C2–C3

Polymerizations were conducted at 60° C. in 650 mL hexanes, with preparation of catalysts similar to that of Example C1 with minor differences in catalyst solution concentration. Other conditions and results are reported in Table I.

Example 6

Preparation of Supported Catalyst.

A 200 mL Schlenk® flask was charged under nitrogen with a magnetic stirbar, 3.02 g silica (Davison 955, previously calcined at 600° C.), 5 mL toluene, and 22 mL MAO (ca. 0.04 mol Al). The contents were stirred at room temperature. In a second, 50 mL round-bottomed flask were stirred under nitrogen 0.062 g $(C_5Me_5)TiCl_3$ (0.21 mmol) in 10 mL toluene, to which mixture was then added 32 µL methanol (previously sparged with nitrogen) and the red solution was stirred for 20 min at room temperature. The solution containing $(C_5Me_5)TiCl_3$ was then transferred via cannula into the slurry (using another 10 mL toluene for rinsing the flask) containing the silica and the resulting dark red to purple slurry was stirred for 45 min, then reduced in vacuo in an oil bath set at 50° C. to a dry, free-flowing purple powder which weighed 5.2 g. The catalyst was found by ICP to have 0.030 mmol(Ti)/g and a molar ratio of Al:Ti of 166:1.

Polymerization Using Supported Catalyst.

A one-liter autoclave reactor was charged with 600 mL hexanes and ca. 0.25 mL MAO and the mixture stirred for 20 min. A glass bottle equipped with stirbar was charged with 50 mL hexanes, followed by 0.25 g supported catalyst previously slurried in 2 mL mineral oil. When the reactor had reached approximately 40° C. the reactor was vented of most of the nitrogen, resealed, and pressurized with 103 psig (0.71 MPa) of a mixture of propylene and ethylene, with the ethylene flow made to equal that of propylene, both measured in L/min. When the reactor had reached within ca. 0.03 MPa of the final pressure, the ratio of propylene to ethylene flows was adjusted to 1:3. The polymerization continued until 1 hour after the introduction of monomer gases, at which time 1 mL of methanol was injected into the reactor, the reactor was vented and the temperature rapidly cooled to room temperature. The polymer was recovered by transfer of the polymer solution to a large glass beaker, to which were added ca. 500 mL of a 1:1 mixture by volume of methanol and 2-propanol. The polymer which precipitated and was filtered and dried in a vacuum oven at 40° C. for at least 16 h. The recovered polymer weighed 4.5 g, for a catalyst activity of 0.60 kg(EPR)/(mmol(Ti)·h).

Example 7
Preparation of Supported Catalyst.

In a 100 mL Schlenk® flask were placed a magnetic stirbar, 3.02 g silica (Davison 955, previously calcined at 600° C.), 4 g toluene, and 25 mL MAO (ca. 0.045 mol Al). This was stirred under nitrogen in an oil bath held between 42–51° C. for 1 hour. In a second Schlenk® flask were mixed 0.062 g ($C_5Me_5$)$TiCl_3$ (0.021 mmol), 7.4 g toluene, and 32 μL methanol, for the period of 1 h at room temperature. The slurry containing the MAO and support material was filtered on a coarse glass frit under nitrogen and washed twice with toluene, and placed briefly under vacuum before being introduced to the drybox for further manipulation. The MAO/silica solid was transferred to a 100 mL Schlenk® flask containing a stirbar covered with 10 mL toluene. The solution containing ($C_5Me_5$)$TiCl_3$ and methanol was added to the slurry. This slurry was stirred for 15 min, turning from dark red to purple, filtered again on a coarse frit, washed twice with nitrogen-sparged hexanes, and dried for 1 hour. The yield of free-flowing, beige powder was 3.88 g. The catalyst was found by ICP to have 0.031 mmol(Ti)/g and a molar ratio of Al:Ti of 120:1. DSC found total crystallinity of 0.11%, and a PRT of −48.6° C.

Polymerization Using Supported Catalyst.

A one-liter autoclave reactor was charged with 600 mL hexanes and ca. 0.25 mL MAO and the mixture stirred for 20 min. A glass bottle equipped with stirbar was charged with 50 mL hexanes, followed by 0.20 g supported catalyst previously slurried in 2 mL mineral oil. When the reactor had reached approximately 40° C. the reactor was vented of most of the nitrogen, resealed, and pressurized with 103 psig (0.71 MPa) of a mixture of propylene and ethylene, with the ethylene flow made to equal that of propylene, both measured in L/min. When the reactor had reached within ca. 0.03 MPa of the final pressure, the ratio of propylene to ethylene flows was adjusted to 1:3. The polymerization continued until 0.5 hour after the introduction of monomer gases, at which time 1 mL of methanol was injected into the reactor, the reactor was vented and the temperature rapidly cooled to room temperature. The polymer was recovered by transfer of the polymer solution to a large glass beaker, to which were then added ca. 500 mL of a 1:1 mixture by volume of methanol and 2-propanol. The polymer precipitated and was filtered and dried in a vacuum oven at 40° C. for at least 16 h. The test yielded 3.9 g polymer, for a catalyst activity of 1.3 kg(EPR)/(mmol(Ti)·h).

Example 8
Polymerization in the Fluidized Gas-Phase Reactor

A fluidized-bed gas-phase polymerization reactor, as described in U.S. Pat. No. 4,588,790, of 14" (35.6 cm) diameter is charged with 100 lb (45.4 kg) polyethylene (0.918 g/cm$^3$) and 10 lb (4.5 kg) carbon black and dried under flowing nitrogen while held at at least 80° C. for at least 8 hours. The temperature of the reactor is dropped to 60° C. The reactor is pressurized to 300 psig (2.11 MPa) with a mixture of gases such that the partial pressures of the gases are in the following ratios: ethylene:propylene:nitrogen=1:0.7:1. ENB (50 mL) is charged into the reactor. The reactor gases are continuously cycled through the reactor at a linear velocity in the reaction zone of 53 cm/sec. A solution of methylalumoxane (100 mL of a 1.8 moles(Al)/L in toluene) is injected into the bed. One half-hour later, a solution of ($C_5Me_5$)$TiCl_3$ and methanol in toluene (0.007 moles(Ti)/L, molar ratio of methanol:Ti= 4:1), which has been stirred for at least 15 minutes, is contacted with a stream of methylalumoxane in toluene (1.8 moles(Al)/L) in a volumetric ratio of titanium solution to alumoxane solution of 1:2. The mixture of ($C_5Me_5$)$TiCl_3$, methanol, alumoxane, and toluene is pumped through a coil of sufficient length to provide at least 10 minutes of residence time before the activated catalyst solution is then taken up by a nitrogen stream and passed into the reactor through a metal tube (3.2 mm outer diameter) which penetrates the reactor wall at a point 1 ft (30.5 cm) above the distributor plate. Catalyst is injected into the reactor at the rate of 1.0 mmol titanium per hour. At the first sign of reaction, a flow of ENB is established such that the weight of ENB introduced per unit time is 7% of the sum of the weights of ethylene and propylene consumed per unit time. At the first sign of reaction, carbon black is fed to the reactor such that the weight of carbon introduced per unit time is 30% of the sum of the weights of ethylene and propylene consumed per unit time. The amount of polymer and carbon black in the reactor is maintained at a total of approximately 50 kg. Unagglomerated product is discharged semi-continuously from the reactor at a rate equal to the sum of the rate of polymer production and the rate of carbon black addition (in weight units) into a chamber normally isolated on both ends by valves, where the product is vented of excess monomers and nitrogen, and is then purged with nitrogen and discharged to an accumulation drum, where it is purged with nitrogen saturated with moisture. The reactor is then run in this manner for 24 hours with an average EPDM polymer production rate of 20 lb/hour (9.1 kg/hour) with no significant fouling, as evidenced by reactor inspection during cleaning.

TABLE I

| Example | Catalyst (mmol) | Additive (eq.) | Cocatalyst (eq.) | Run time, h | Pressure (psi) | Pressure (MPa) |
|---|---|---|---|---|---|---|
| 1 | ($C_5Me_5$)$TiCl_3$ (1) | MeOH (4) | MAO (1000) | 0.5 | 107 | 0.74 |
| 2 | ($C_5Me_5$)$TiCl_3$ (1) | MeOH (4) | MAO (1000) | 0.5 | 104 | 0.72 |
| 3 | ($C_5Me_5$)$TiCl_3$ (5) | MeOH (4) | MAO (500) | 1 | 102 | 0.70 |
| 4 | ($C_5Me_5$)$TiCl_3$ (1) | EtOH (20) | MAO (1000) | 0.25 | 104 | 0.72 |

TABLE I-continued

| Example | | | | | | |
|---|---|---|---|---|---|---|
| 5 | (C$_5$H$_5$)TiCl$_3$ (1) | MeOH (4) | MAO (1000) | 0.5 | 100 | 0.69 |
| C1 | (C$_5$Me$_5$)TiCl$_3$ (1) | none | MAO (1000) | 0.5 | 99 | 0.68 |
| C2 | (C$_5$Me$_5$)Ti(OMe)$_3$ (1) | none | MAO (1000) | 0.5 | 137 | 0.94 |
| C3 | (C$_5$Me$_5$)TiCl$_3$ (1) | MeOH (800) | MAO (1000) | 0.5 | 97 | 0.67 |

| Example | C$_3^-$:C$_2^-$, fill | C$_3^-$:C$_2^-$, feed | Yield, g | activity, kg(polymer)/(mmol(Ti) · h) | C$_3^-$, wt % | FI |
|---|---|---|---|---|---|---|
| 1 | 1:1 | 1:3 | 8.9 | 17.8 | 38 | 0.53 |
| 2 | 2:1 | 1:2 | 0.76 | 1.52 | | |
| 3 | 1:1 | 1:3 | 0.5 | 0.1 | | |
| 4 | 1:1 | 1:3 | 1.6 | 6.4 | 38 | |
| 5 | 1:1 | 1:3 | 1.65 | 3.3 | 45 | |
| C1 | 1:1 | 1:3 | 3.24 | 6.48 | 39 | |
| C2 | 1:1 | 1:3 | 0.83 | 1.66 | 41 | |
| C3 | 8:1 | 1:1 | 0 | 0 | | |

What is claimed is:

1. A catalyst composition comprising:
   (A) a titanium metal compound represented by the formula: (C$_5$R$^1{}_5$)TiX$_2$Q, wherein each R$^1$ is independently selected from the group consisting of hydrogen, a C$_1$–C$_8$ alkyl, an aryl, and a heteroatom-substituted aryl or alkyl; each X is a halide atom selected from the group consisting of F, Br, Cl, and I; and Q is a monoanionic ligand selected from the group consisting of a halide, a C$_1$–C$_{18}$ alkyl, an aryl, a C$_1$–C$_{18}$ alkoxide, aryloxide, amide, thiolate, carboxylate, carbamate and mixtures thereof, with the proviso that there is no linkage between Q and any R$^1$ group which forms a ring;
   (B) a compound having the formula: R$^3$OH, wherein R$^3$ is a linear or branched C$_1$–C$_3$ alkyl group; and
   (C) an aluminoxane.

2. The catalyst of claim 1 wherein a support or spray drying material is employed.

3. The catalyst of claim 1 wherein the molar ratio of Component B to Component A ranges from about 2:200; the molar ratio of Component C to Component A ranges from about 10:10,000, with the proviso that the ratio of Component B to Component C does not exceed 0.7:1.

4. The catalyst of claim 1 wherein Component B has a pK$_a$ ranging from about 0 to 20.

5. The catalyst of claim 2 wherein the amount of support or spray drying material ranges from about 7 to 200 grams/millimole of titanium metal compound.

6. The catalyst of claim 1 wherein R$^1$ is a methyl group; and the aluminoxane is methylaluminoxane.

* * * * *